US011358461B2

(12) United States Patent
Matsuda

(10) Patent No.: US 11,358,461 B2
(45) Date of Patent: Jun. 14, 2022

(54) ELECTRICITY GENERATION SYSTEM AND PROPULSION APPARATUS INCLUDING THE SAME

(71) Applicant: KAWASAKI MOTORS, LTD., Akashi (JP)

(72) Inventor: Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/548,244

(22) Filed: Aug. 22, 2019

(65) Prior Publication Data

US 2020/0079204 A1    Mar. 12, 2020

(30) Foreign Application Priority Data

Sep. 11, 2018  (JP) .............................. JP2018-169534

(51) Int. Cl.
*B60K 6/24* (2007.10)
*F02B 37/00* (2006.01)
(Continued)

(52) U.S. Cl.
CPC .................. *B60K 6/24* (2013.01); *B60K 6/26* (2013.01); *B60K 6/28* (2013.01); *F02B 37/00* (2013.01);
(Continued)

(58) Field of Classification Search
CPC .... B60K 6/24; B60K 6/26; B60K 6/28; F02B 37/00; H02K 7/1815; H02K 11/0094;
(Continued)

(56) References Cited

U.S. PATENT DOCUMENTS 3,680,305 A * 8/1972 Miller ....................... F01D 1/04
123/538
4,633,671 A * 1/1987 Schatz ................ F02B 29/0481
60/605.1
(Continued)

FOREIGN PATENT DOCUMENTS

DE    102008014249 A1    9/2009
DE    102010025002 A1    12/2011
(Continued)

OTHER PUBLICATIONS

German Patent and Trademark Office, Office Action Issued in Application No. 102019124337.8, dated Oct. 29, 2021, 9 pages.

*Primary Examiner* — Logan M Kraft
*Assistant Examiner* — John D Bailey
(74) *Attorney, Agent, or Firm* — Alleman Hall Creasman & Tuttle LLP

(57) ABSTRACT

An electricity generation system includes an internal combustion engine and at least one electricity generation motor that generates electricity upon an input shaft thereof being rotated by the internal combustion engine, wherein the internal combustion engine includes: a piston reciprocable in a cylinder; a valve actuating mechanism that actuates an intake valve and exhaust valve; a supercharger that compresses intake air to be delivered into the cylinder; and a fuel feeder, and wherein while the piston reciprocates once by starting from a top dead center and returning to the top dead center, the valve actuating mechanism actuates the intake and exhaust valves in such a manner as to provide a valve overlap period, the fuel feeder feeds fuel into the cylinder after closing of the exhaust valve, and an air-fuel mixture inside the cylinder is burned during a period in which both of the intake and exhaust valves are closed.

20 Claims, 9 Drawing Sheets

(51) Int. Cl.
*B60K 6/28* (2007.10)
*B60K 6/26* (2007.10)
*H02K 7/18* (2006.01)
*H02K 11/00* (2016.01)

(52) U.S. Cl.
CPC ....... *H02K 7/1815* (2013.01); *H02K 11/0094* (2013.01); *B60Y 2200/12* (2013.01); *B60Y 2200/50* (2013.01); *B60Y 2200/92* (2013.01); *B60Y 2400/435* (2013.01)

(58) Field of Classification Search
CPC ............ B60Y 2200/12; B60Y 2200/50; B60Y 2200/92; B60Y 2400/435
USPC .......................................................... 701/103
See application file for complete search history.

(56) References Cited

U.S. PATENT DOCUMENTS

| | | | | |
|---|---|---|---|---|
| 4,699,097 A * | 10/1987 | Tanaka | ................... | B60K 6/485 290/51 |
| 4,760,702 A * | 8/1988 | Ammann | .............. | F02B 37/005 60/624 |
| 5,469,820 A * | 11/1995 | Data | ....................... | B60K 6/485 123/195 E |
| 5,823,280 A * | 10/1998 | Lateur | .................... | B60K 6/387 903/906 |
| 6,442,455 B1 * | 8/2002 | Kotre | .................. | F02D 41/2441 123/681 |
| 6,516,770 B1 * | 2/2003 | Berger | ..................... | H02K 7/04 123/192.1 |
| 8,800,530 B2 * | 8/2014 | Vijayaraghavan | ........................... | F02D 13/0257 123/308 |
| 10,245,952 B1 * | 4/2019 | Patterson | .............. | B60B 19/003 |
| 2008/0173277 A1 * | 7/2008 | Otterspeer | ............ | F02D 41/126 123/179.5 |
| 2011/0239642 A1 * | 10/2011 | Schwiesow | ............. | F02B 25/08 60/595 |
| 2012/0042649 A1 * | 2/2012 | Kaneko | ...................... | F01L 1/08 123/90.15 |
| 2013/0199463 A1 * | 8/2013 | Pischinger | .............. | B60L 50/62 123/2 |
| 2014/0297079 A1 * | 10/2014 | Saitoh | ................... | B60W 20/00 903/930 |
| 2015/0176478 A1 * | 6/2015 | Wicks | ..................... | F01N 3/101 60/599 |
| 2015/0285161 A1 * | 10/2015 | Ulrey | ...................... | F02D 23/02 477/3 |
| 2016/0129901 A1 * | 5/2016 | Migita | ................... | B60K 6/365 903/910 |
| 2017/0114709 A1 * | 4/2017 | Okita | ............... | F02M 35/10255 |
| 2017/0190434 A1 * | 7/2017 | Dong | .................... | H02M 7/797 |
| 2017/0226925 A1 * | 8/2017 | Laimboeck | .............. | B60K 6/24 |
| 2018/0134384 A1 | 5/2018 | Ichihara | | |
| 2018/0326971 A1 * | 11/2018 | Lindström | ................ | B60K 6/48 |
| 2019/0263382 A1 * | 8/2019 | Parsels | ..................... | B60K 6/26 |
| 2019/0326790 A1 * | 10/2019 | Hao | ......................... | H02K 5/15 |

FOREIGN PATENT DOCUMENTS

| | | |
|---|---|---|
| JP | H08047107 A | 2/1996 |
| JP | 2002322928 A | 11/2002 |
| JP | 2004352042 A | 12/2004 |
| JP | 2008069697 A | 3/2008 |
| JP | 2010173390 A | 8/2010 |
| JP | 2015200294 A | 11/2015 |
| JP | 2016053326 A | 4/2016 |
| WO | 2017030034 A1 | 2/2017 |

* cited by examiner

ELECTRICITY GENERATION SYSTEM AND PROPULSION APPARATUS INCLUDING THE SAME

CROSS-REFERENCE TO RELATED APPLICATION

This application claims priority to and the benefit of Japanese Patent Application No. 2018-169534, filed on Sep. 11, 2018, the entire disclosure of which is incorporated herein by reference.

BACKGROUND OF THE INVENTION

Field of the Invention

The present disclosure relates to an electricity generation system employing an internal combustion engine and a propulsion apparatus including the electricity generation system.

Description of the Related Art

Electricity generation systems that generate electricity using an engine as a drive source to drive an electricity generator have been conventionally known (see Japanese Laid-Open Patent Application Publication No. 2010-173390 and Japanese Laid-Open Patent Application Publication No. H08-47107, for example).

There is a demand for improving the electricity generation efficiency of electricity generation systems as described above which employ an internal combustion engine.

SUMMARY OF THE INVENTION

An object of the present invention is to provide an electricity generation system capable of exhibiting improved electricity generation efficiency and a propulsion apparatus including the electricity generation system.

In order to attain the above object, an electricity generation system according to an aspect of the present invention includes: an internal combustion engine operated in a predetermined rotational speed range; and at least one electricity generation motor that generates electricity upon an input shaft thereof being rotated by the internal combustion engine, wherein the internal combustion engine includes: a piston reciprocable in a cylinder; a valve actuating mechanism that actuates an intake valve to open and close an intake opening and that actuates an exhaust valve to open and close an exhaust opening; a supercharger that compresses intake air to be delivered into the cylinder; and a fuel feeder that feeds fuel, and wherein while the piston reciprocates once by starting from a top dead center and returning to the top dead center, the valve actuating mechanism actuates the intake valve and the exhaust valve in such a manner as to provide a valve overlap period in which both the exhaust valve and the intake valve are open, the fuel feeder feeds the fuel into the cylinder after closing of the exhaust valve, and an air-fuel mixture inside the cylinder is burned during a period in which both the exhaust valve and the intake valve are closed.

With the above configuration, there is provided an internal combustion engine in which the air-fuel mixture inside the cylinder is burned once for every reciprocation of the piston; namely, a two-stroke engine is provided as an internal combustion engine for electricity generation. With this two-stroke engine, the energy extracted per unit rotational speed (thermal energy generated by combustion and therefore mechanical energy derived from the rotational motion of the crank shaft) is higher than with a four-stroke engine in which the air-fuel mixture inside the cylinder is burned once during two reciprocations of the piston. For this reason, the rotational speed range over which the engine operates with high efficiency can be shifted to the low rotational speed side. By thus achieving high-efficiency operation in a low rotational speed range and avoiding operation in a high rotational speed range, mechanical loss including pumping loss and sliding friction loss can be reduced. As for the electricity generation motor, reduction in counter-electromotive force can be achieved by the avoidance of operation in a high rotational speed range, and the electricity generation efficiency can be increased. That is, a low rotational speed range over which both the internal combustion engine and the electricity generation motor efficiently operate can be employed as the predetermined rotational speed range for the internal combustion engine, and the overall electricity generation efficiency of the system can be improved.

The inclusion of the supercharger makes it possible to supply supercharged air into the cylinder and increase the amount of air intake (compressibility), resulting in increased combustion efficiency. The provision of the valve overlap period enables promoting scavenging by the use of supercharged air during this period. Feeding the fuel into the cylinder after closing of the exhaust valve leads to prevention of discharge of unburned fuel to the outside of the cylinder, thus providing a reduction in the amount of unburned fuel contained in exhaust gas.

In the electricity generation system, the intake opening and the exhaust opening may be formed such that in an axial direction of the cylinder, the intake opening and the exhaust opening are opposite from a crank shaft coupled to the piston when viewed from the piston positioned at the top dead center. With this configuration, air intake can be continued even when the piston is close to the top dead center, unlike with a configuration in which a piston itself opens and closes an intake opening while moving between the top dead center and the bottom dead center (i.e., a configuration in which a piston itself functions as an intake valve). This increases the flexibility in setting the intake period.

In the electricity generation system, the fuel feeder may be a direct-injection injector that injects the fuel into the cylinder after closing of the intake valve. With this configuration, since the fuel is injected after closing of the intake valve, the compression ratio in the cylinder can be further increased to further improve the fuel efficiency.

In the electricity generation system, the input shaft of the electricity generation motor may be connected to an output shaft of the internal combustion engine so as to rotate at the same speed as the output shaft of the internal combustion engine. With this configuration, since the internal combustion engine is a two-stroke engine capable of operating at a low rotational speed and a high torque, the electricity generation efficiency can be improved without having to provide a speed-reducing mechanism between the input shaft of the electricity generation motor and the output shaft of the internal combustion engine, and the overall structure of the system can be simplified.

In the electricity generation system, the at least one electricity generation motor may include a plurality of electricity generation motors. With this configuration, when the electricity generation system is constructed as a unit, the locations where the individual electricity generation motors are connected can be adjusted in the entire unit. Thus, the position of the center of gravity of the unit can be more properly adjusted than with a configuration in which only one electricity generation motor is provided.

In the electricity generation system, the electricity generation motors may be aligned with each other in an axial direction of a crank shaft coupled to the piston. With this configuration, displacement of the center of gravity of the entire electricity generation system in the axial direction of the crank shaft can be more easily prevented than with a configuration in which only one electricity generation motor is provided.

In the electricity generation system, the internal combustion engine may include a crank shaft coupled to the piston and a balancer shaft operable in conjunction with the crank shaft to rotate at the same speed as the crank shaft and suppress first-order couple vibration of the crank shaft, and wherein the input shaft of the electricity generation motor may receive power transmitted from the crank shaft via the balancer shaft. With this configuration, the flexibility in choosing the location where the electricity generation motor is mounted is higher than with a configuration in which the electricity generation motor is directly connected to the crank shaft. This offers increased design flexibility. For example, the electricity generation motor can be located axially inward of both ends of the crank shaft in the axial direction of the crank shaft to prevent the electricity generation motor from projecting in the axial direction of the crank shaft and prevent an increase in the overall axial dimension of the electricity generation system constructed as a unit. This allows compact construction of the system as a whole.

A propulsion apparatus according to the present invention may include: any one of the electricity generation systems as defined above; an electricity storage device that stores electricity generated by the electricity generation system; and a propulsion motor that functions as a propulsion drive source by receiving electricity supplied from the electricity storage device. With this configuration, an efficient propulsion apparatus can be provided.

In the propulsion apparatus, the internal combustion engine may further include a throttle valve that adjusts the amount of intake air to be delivered into the cylinder and an actuator that actuates the throttle valve. In this case, the propulsion apparatus may further include a controller that controls the actuator based on at least one of the amount of electricity stored in the electricity storage device and a propulsion demand made on the propulsion motor. With this configuration, the torque of the internal combustion engine is controlled via the actuator according to whether the amount of stored electricity is excessive or insufficient and/or whether the propulsion demand is high or low, so that the output of the internal combustion engine can be prevented from being excessive or insufficient.

The propulsion apparatus may be installed in a traveling body that travels on land or a flying body that flies in air. The propulsion apparatus having the above configuration is suitable for use in machines for which the demand for weight reduction or vibration reduction is relatively high.

The above and further objects, features and advantages of the present invention will be more apparent from the following detailed description of preferred embodiments with reference to the accompanying drawings.

DETAILED DESCRIPTION OF THE EMBODIMENTS

Hereinafter, electricity generation systems according to exemplary embodiments and propulsion apparatuses including any of the electricity generation systems will be described with reference to the drawings. Throughout all the drawings, the same or equivalent elements are denoted by the same reference signs and will not be repeatedly described in detail. On the lower side of a cylinder in the cylinder axis direction there lies the bottom dead center of a piston which is inserted in the cylinder in the cylinder axis direction, while on the upper side of the cylinder in the cylinder axis direction there lies the top dead center of the piston which is inserted in the cylinder in the cylinder axis direction.

First Embodiment

Figure 1:
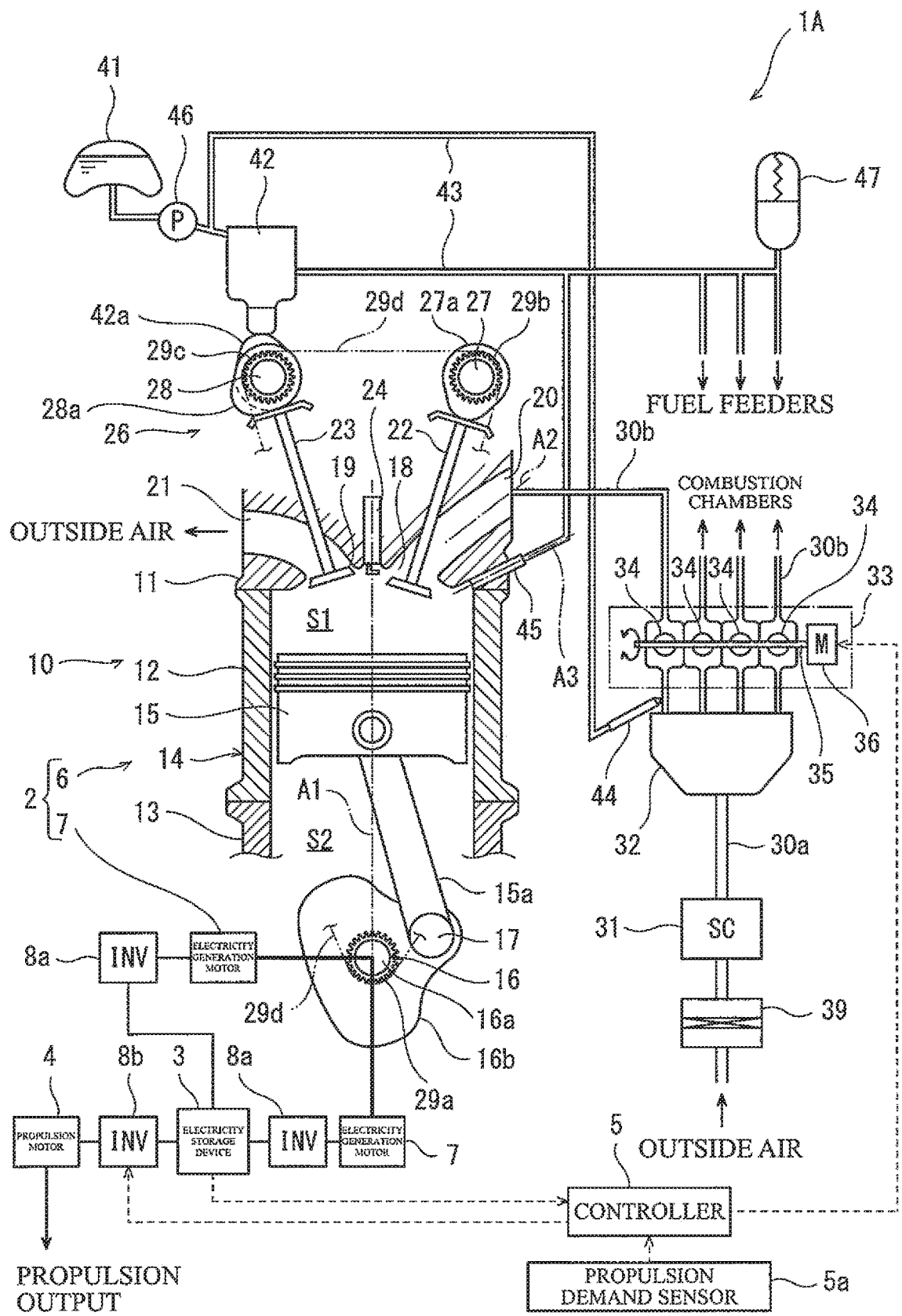
FIG. 1 is a conceptual diagram of a propulsion apparatus according to a first embodiment.

FIG. 1 is a conceptual diagram of a propulsion apparatus 1A according to a first embodiment. Propulsion drive apparatuses installed in straddle vehicles are described as examples of the propulsion apparatus 1A of the present embodiment and propulsion apparatuses 1B and 1C according to second and third embodiments which will be described later. A straddle vehicle refers to any vehicle having a seat or saddle on which a driver sits in a straddling position, regardless of whether the vehicle has wheels. Preferred examples of the straddle vehicle include two-wheeled motorcycles (including so-called scooters), three-wheeled motorcycles, buggies, and personal watercrafts.

The propulsion apparatus 1A includes: an electricity generation system 2; an electricity storage device 3 that stores electricity generated by the electricity generation system 2; a propulsion motor 4 that functions as a propulsion drive source for the straddle vehicle by receiving electricity supplied from the electricity storage device 3; and a controller 5.

The electricity generation system 2 includes an internal combustion engine (hereinafter referred to as "engine") 6 and at least one electricity generation motor 7 that generates electricity upon an input shaft thereof being rotated by the engine 6 (two electric motors 7 are provided in this example). The engine 6 is operated in a predetermined constant speed rotation range as described later.

The engine 6 is a multi-cylinder, two-stroke, spark ignition reciprocating engine of the downdraft type. In the present embodiment, the fuel for the engine 6 is gasoline (the fuel may be a liquid alcohol such as ethanol or methanol). The engine 6 is an engine equipped with a supercharger. FIG. 1 conceptually illustrates the engine 6 as an inline four-cylinder engine. However, the number and arrangement of the cylinders are not necessarily limited. The engine 6 may be a single-cylinder engine. When the engine 6 is a multi-cylinder engine, the cylinders may be arranged in a V-pattern or in a horizontally-opposed fashion.

The engine 6 includes a cylinder 14 and an engine main body 10 defining a combustion chamber S1 and a crank chamber S2. The dashed-dotted line A1 in FIG. 1 represents the cylinder axis. The engine main body 10 includes a cylinder head 11, a cylinder block 12, and a crank case 13, and these main body components 11 to 13 are coupled in order in the cylinder axis direction. In the present specification, a cylinder head cover 11a (see FIG. 4) is regarded as a part of the cylinder head 11. The cylinder 14 is constituted mainly by the cylinder block 12, and the crank chamber S2 is defined mainly by the crank case 13.

The engine 6 includes a piston 15 and a crank shaft 16. The piston 15 is reciprocable in the cylinder 14, and is coupled to the crank shaft 16 via a connecting rod 15a. The crank shaft 16 is rotatably supported by the crank case 13 and is housed in the crank chamber S2. During one reciprocation of the piston 15, the crank shaft 16 makes one rotation.

Figure 2:
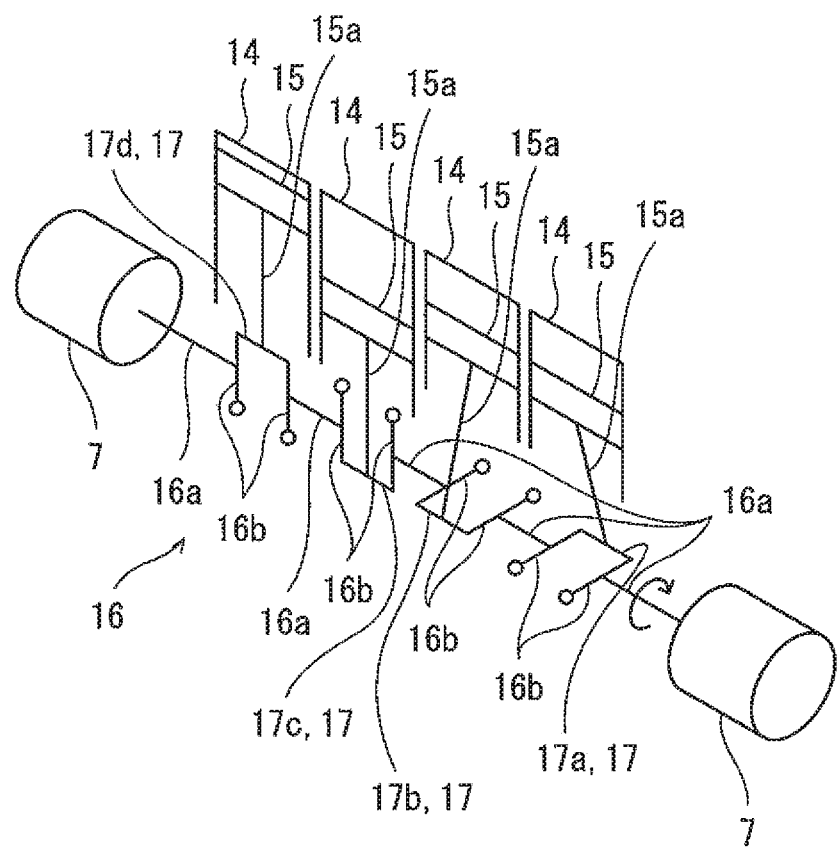
FIG. 2 is a schematic diagram showing the interior of an internal combustion engine of the propulsion apparatus shown in FIG. 1.

FIG. 2 schematically shows the four cylinders 14 and the crank shaft 16 of the engine 6. The crank shaft 16 includes a plurality of journal portions 16a located on the rotational axis of the crank shaft 16 and crank pin portions 17 provided in one-to-one correspondence with the cylinders 14 to rotatably support the connecting rods 15a. The journal portions 16a and the crank pin portions 17 are connected by crank arms 16b. In the present embodiment, the crank arms 16b function also as crank weights for reducing the inertial force of the pistons 15 and connecting rods 15a (see FIG. 1).

In the present embodiment, as shown in FIG. 2, the four crank pin portions 17 are arranged to have a phase difference of 90° or 180° from one another. Specifically, assuming that the four crank pin portions 17 are referred to as a first pin portion 17a, a second pin portion 17b, a third pin portion 17c, and a fourth pin portion 17d in order along the rotational axis of the crank shaft 16 and that the rotational direction of the crank shaft 16 is the positive direction, then, as shown in FIG. 2, the second pin portion 17b is disposed in such a position as to have a phase difference of 180° from the first pin portion 17a, the third pin portion 17c is disposed in such a position as to have a phase difference of 90° from the first pin portion 17a, and the fourth pin portion 17d is disposed in such a position as to have a phase difference of 270° (namely 90° in the negative direction) from the first pin portion 17a.

The arrangement of the four crank pin portions 17 is not limited to that described above. For example, the second pin portion 17b may be disposed in such a position as to have a phase difference of 90° from the first pin portion 17a, the third pin portion 17c may be disposed in such a position as to have a phase difference of 270° (namely 90° in the negative direction) from the first pin portion 17a, and the fourth pin portion 17d may be disposed in such a position as to have a phase difference of 180° from the first pin portion 17a.

As shown in FIG. 2, the input shafts of the electricity generation motors 7 are respectively connected to both ends of the crank shaft 16. The crank shaft 16 and the respective input shafts of the electricity generation motors 7 are connected via members such as shaft couplings so as to be coaxial with one another. That is, the two electricity generation motors 7 are aligned with each other in the axial direction of the crank shaft 16. Upon rotation of the crank shaft 16 serving as an output shaft of the engine 6, the respective input shafts of the electricity generation motors 7 are rotationally driven at a rotational speed equal to that of the crank shaft 16.

(Combustion Chamber and Valve System)

Referring back to FIG. 1, the combustion chamber S1 is provided above the top surface of the piston 15 in the cylinder axis direction. The ceiling surface of the combustion chamber S1 is formed by the cylinder head 11. At least one intake opening 18 and at least one exhaust opening 19 open to the combustion chamber S1, in particular to the ceiling surface of the combustion chamber S1. The intake opening 18 communicates with an intake port 20 formed inside the cylinder head 11 and forms a downstream end of the intake port 20 and therefore of the intake passage. The exhaust opening 19 communicates with an exhaust port 21 formed inside the cylinder head 11 and forms an upstream end of the exhaust port 21 and therefore of the exhaust passage.

The intake opening 18 is opened and closed by an intake valve 22, while the exhaust opening 19 is opened and closed by an exhaust valve 23. The intake valve 22 is a poppet valve, in which an umbrella-shaped valve element is biased by a valve spring (not shown) so as to be in close contact with a valve seat (not shown) provided in the vicinity of the intake opening 18. The exhaust valve 23 is configured in the same manner as the intake valve 22. An ignition plug 24 is attached to the cylinder head 11 in such a manner that an electrode (spark generation member) of the ignition plug 24 is located inside the combustion chamber S1 and in proximity to the ceiling surface of the combustion chamber S1. The timing at which the ignition plug 24 is operated, i.e., the timing of ignition of an air-fuel mixture, is controlled by the controller 5.

Figure 3A:
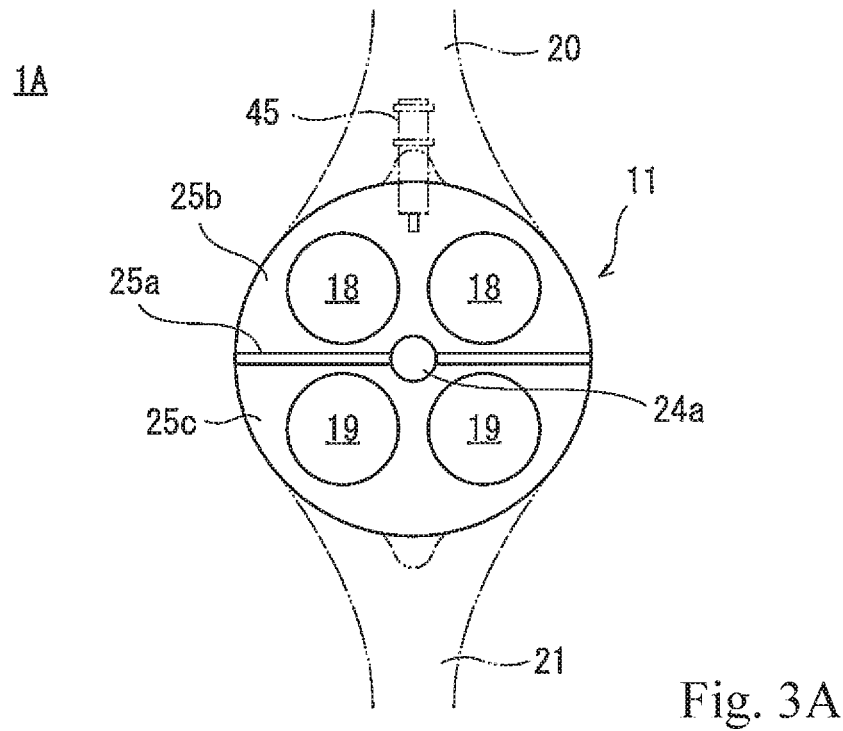
FIG. 3A shows a combustion chamber as viewed from below.

FIG. 3A shows the combustion chamber S1 as viewed from below, and the ceiling surface of the combustion chamber S1 is seen. In the present embodiment, two intake openings 18 and two exhaust openings 19 are provided. The intake port 20 has one inlet for intake of air and is branched at an intermediate point into two parts, which respectively communicate with the two intake openings 18. The exhaust port 21 has two parts respectively communicating with the two exhaust openings 19. The two parts merge at an intermediate point, and the exhaust port 21 has one outlet for discharge of exhaust gas. The ceiling surface of the combustion chamber S1 is formed in an approximately hemispherical shape. A plug hole 24a holding the ignition plug 24 (see FIG. 1) is provided at the center of the ceiling surface.

Figure 3B:
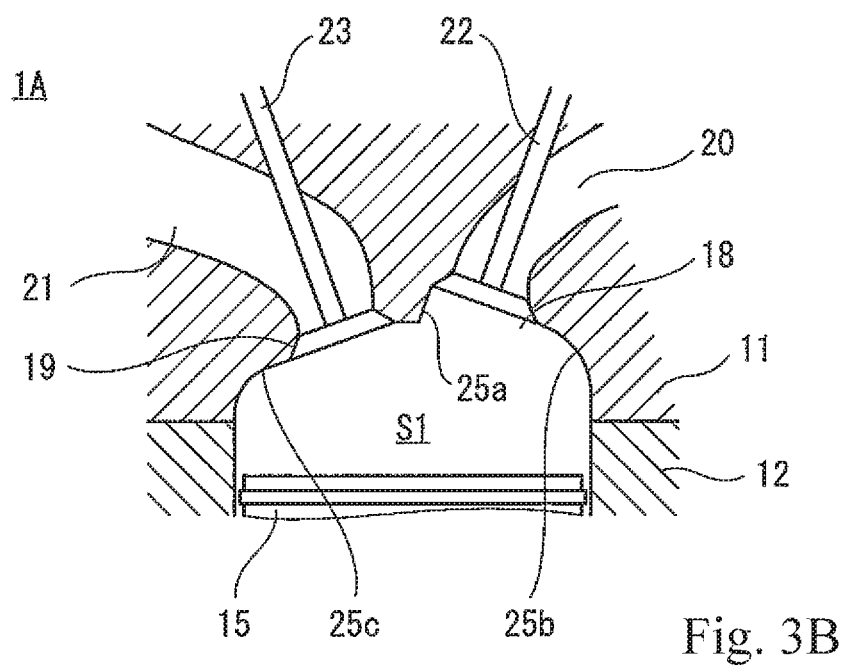
FIG. 3B is an enlarged view of intake and exhaust openings and their vicinity.

The ceiling surface of the combustion chamber S1 has a stepped portion 25a extending along the diameter of the ceiling surface, and the ceiling surface is divided by the stepped portion 25a into a first region 25b and a second region 25c. The two intake openings 18 open to the first region 25b, while the two exhaust openings 19 open to the second region 25c. As shown in FIG. 3B, the second region 25c is located below the first region 25b in the cylinder axis direction. Since both the intake openings 18 and the exhaust openings 19 open to the ceiling surface of the combustion chamber S1, the openings are located above the top dead center of the cylinder 14 in the cylinder axis direction. More specifically, both the intake openings 18 and the exhaust openings 19 are formed such that in the cylinder axis direction, the openings are opposite from the crank shaft 16 when viewed from the piston 15 positioned at the top dead center (or with respect to the piston 15 positioned at the top dead center). The exhaust openings 19 open to the combustion chamber S1 at lower locations in the cylinder axis direction than the intake openings 18.

Referring back to FIG. 1, the engine 6 includes a valve actuating mechanism 26 that actuates the intake valve 22 and the exhaust valve 23. In the present embodiment, the valve actuating mechanism 26 is of the overhead camshaft (OHC) type, in particular the double overhead camshaft type (DOHC). The valve actuating mechanism 26 includes an intake camshaft 27, an intake cam 27a, an exhaust camshaft 28, an exhaust cam 28a, and a transmission mechanism 29. The intake camshaft 27 and the exhaust camshaft 28 are located above the intake valve 22 and exhaust valve 23 in the cylinder axis direction and extend parallel to the crank shaft 16. The transmission mechanism 29 transmits the rotation of the crank shaft 16 to the intake camshaft 27 and the exhaust camshaft 28. The transmission mechanism 29 is, for example, a chain transmission mechanism, which is constituted by a drive sprocket 29a fixed to the crank shaft 16, an intake-side driven sprocket 29b fixed to the intake camshaft 27, an exhaust-side driven sprocket 29c fixed to the exhaust camshaft 28, and a chain 29d wound around the three sprockets 29a to 29c. The transmission mechanism 29 may be a gear train. The intake cam 27a is fixed to the intake camshaft 27, and rotates together with the intake camshaft 27 to come into contact with the top end of the intake valve 22. The exhaust cam 28a is fixed to the exhaust camshaft 28, and rotates together with the exhaust camshaft 28 to come into contact with the top end of the exhaust valve 23. The intake cam 27a and exhaust cam 28a each have one cam nose. In other words, the cams are formed in an oval shape when viewed in the axial direction of the camshaft. The cams 27a and 28a cause the corresponding valves 22 and 23 to open once during one rotation of the corresponding camshafts 27 and 28.

The engine 6 is a two-stroke engine, and one engine cycle involving air intake, ignition-combustion, and exhaust gas discharge is completed during one reciprocation of the piston 15 and one rotation of the crank shaft 16. This feature will be described later with reference to FIG. 5. The intake camshaft 27 and the exhaust camshaft 28 rotate at the same speed as the crank shaft 16. In the present embodiment, the three sprockets 29a to 29c have the same number of teeth or the same diameter. Thus, a valve opening period in which the intake valve 22 is open and a valve opening period in which the exhaust valve 23 is open are set to occur once during one reciprocation of the piston 15 and one rotation of the crank shaft 16.

(Intake System and Fuel System)

The engine 6 includes an air cleaner 39, a supercharger 31, an intake chamber box 32, and a throttle device 33 as components constituting the intake system. In this intake system, outside air is taken in as intake air and purified by the air cleaner 39. The purified intake air is compressed by the supercharger 31, and the compressed intake air flows into the intake chamber box 32. The supercharger 31 is, for example, a mechanical supercharger, which is rotationally driven by the crank shaft 16. Various types of mechanical superchargers are available and, in the present embodiment, the supercharger 31 is embodied by a centrifugal pump. The intake chamber box 32 absorbs intake air pressure pulsation.

The throttle device 33 is disposed downstream of the supercharger 31 and the intake chamber box 32 in the flow direction of intake air. One supercharger 31 and one intake chamber box 32 are provided, and the outlet of the supercharger is connected to the inlet of the chamber via a single intake passage 30a. The intake chamber box 32 has chamber outlets, the number of which is equal to the number of the cylinders. The chamber outlets are respectively connected to the combustion chambers S1 through a plurality of intake passages 30b which are independent of one another.

The throttle device 33 includes: four throttle valves 34 each of which adjusts the flow rate of air entering a corresponding one of the combustion chambers S1 (the amount of air intake); and an actuator 36 that actuates the throttle valves 34. The four throttle valves 34 are in one-to-one correspondence with the four cylinders 14. Each throttle valve 34 is, for example, a butterfly valve, which has a circular valve element. Rotation of the circular valve element causes a change in the opening degree of the intake passage 30b leading to the combustion chamber S1. That is, the respective valve elements of the throttle valves 34 are placed within the intake passages 30b leading to the combustion chambers S1. These valve elements are fixed to or integrated with a valve shaft 35, and the actuator 36 rotationally drives the valve shaft 35. The throttle device 33 is an electronically controlled device, which is controlled by the controller 5. That is, the actuator 36 is controlled by the controller 5 and is, for example, an electric motor. The details of the control of the throttle device 33 by the controller 5 will be described later.

The engine 6 includes a fuel tank 41, a fuel pressurizing mechanism 42, a fuel pipe 43, an upstream fuel feeder 44, a downstream fuel feeder 45, a primary fuel pump 46, and an accumulator 47 as components constituting the fuel system. The fuel tank 41 stores the fuel for the engine 6.

The primary fuel pump 46 pressurizes the fuel stored in the fuel tank 41. For example, the fuel is pressurized up to about 300 kPa. The fuel pressurizing mechanism 42 further pressurizes the fuel pressurized by the primary fuel pump 46. The fuel pressurizing mechanism 42 is, for example, a plunger pump, by which the fuel is pressurized up to about 2 MPa. In the present embodiment, the pressurization power source for the fuel pressurizing mechanism 42 (reciprocation power source for the plunger of the fuel pressurizing mechanism 42) is the valve actuating mechanism 26 and therefore the engine 6. That is, the valve actuating mechanism 26 has both the function of actuating the intake and exhaust valves 22 and 23 and the function of actuating the fuel pressurizing mechanism 42. The fuel pressurizing mechanism 42 is located above the intake and exhaust valves 22 and 23 in the cylinder axis direction and attached to the cylinder head 11. As shown in FIG. 1, a pressurization cam 42a is fixed to the exhaust camshaft 28 in addition to the exhaust cam 28a. The pressurization cam 42a has one cam nose. In other words, the pressurization cam 42a is formed in an oval shape when viewed in the axial direction of the camshaft. The plunger of the fuel pressurizing mechanism 42 comes into contact with the pressurization cam 42a. The fuel pressurizing mechanism 42 is opposite from the exhaust valve 23 in the radial direction of the exhaust camshaft 28. The plunger of the fuel pressurizing mechanism 42 is driven by being pushed by the pressurization cam 42a rotating together with the exhaust camshaft 28. As a result, the fuel flowing from the primary fuel pump 46 into the housing of the fuel pressurizing mechanism 42 is pressurized and delivered to the outside of the housing.

The upstream fuel feeder 44 and the downstream fuel feeder 45 are provided for each cylinder. The upstream fuel feeder 44 is disposed upstream of the throttle device 33 in the flow direction of intake air, while the downstream fuel feeder 45 is disposed downstream of the throttle device 33 in the flow direction of intake air. Both the upstream fuel feeder 44 and the downstream fuel feeder 45 are normally closed solenoid-operated valves, and the valve opening timing, valve opening period, and valve closing timing of the feeders are controlled by the controller 5 mentioned above. The fuel pipe 43 delivers the fuel pressurized by the primary fuel pump 46 to the upstream fuel feeder 44, and delivers the fuel pressurized by the fuel pressurizing mechanism 42 to the downstream fuel feeder 45. The accumulator 47 is connected to that part of the fuel pipe 43 which connects the fuel pressurizing mechanism 42 to the downstream fuel feeder 45, and absorbs fuel pressure pulsation in this part.

The upstream fuel feeders 44 are in one-to-one correspondence with the intake passages 30b. For example, each upstream fuel feeder 44 injects the fuel into the corresponding intake passage 30b from a location upstream of the throttle device 33 in the flow direction of intake air. The upstream fuel feeder 44 may be housed in the intake chamber box 32 as shown in FIG. 4.

The downstream fuel feeders 45 are disposed downstream of the upstream fuel feeders 44 in the flow direction of intake air. The downstream fuel feeders 45 are attached to the cylinder head 11 and are in one-to-one correspondence with the cylinders 14. In the present embodiment, the injection opening of each downstream fuel feeder 45 opens to the combustion chamber S1 of the corresponding cylinder 14. That is, each downstream fuel feeder 45 is a direct-injection injector that injects the fuel directly into the corresponding cylinder 14. The timing of fuel injection from the downstream fuel feeders 45 is controlled by the controller 5.

As shown in FIG. 1, the downstream fuel feeder 45 is disposed below the intake port 20 in the cylinder axis direction. As shown in FIG. 3A, the intake port 20 is branched into two parts on the downstream side, and the downstream fuel feeder 45 is located beneath the branch point between the two parts of the intake port 20.

Figure 4:
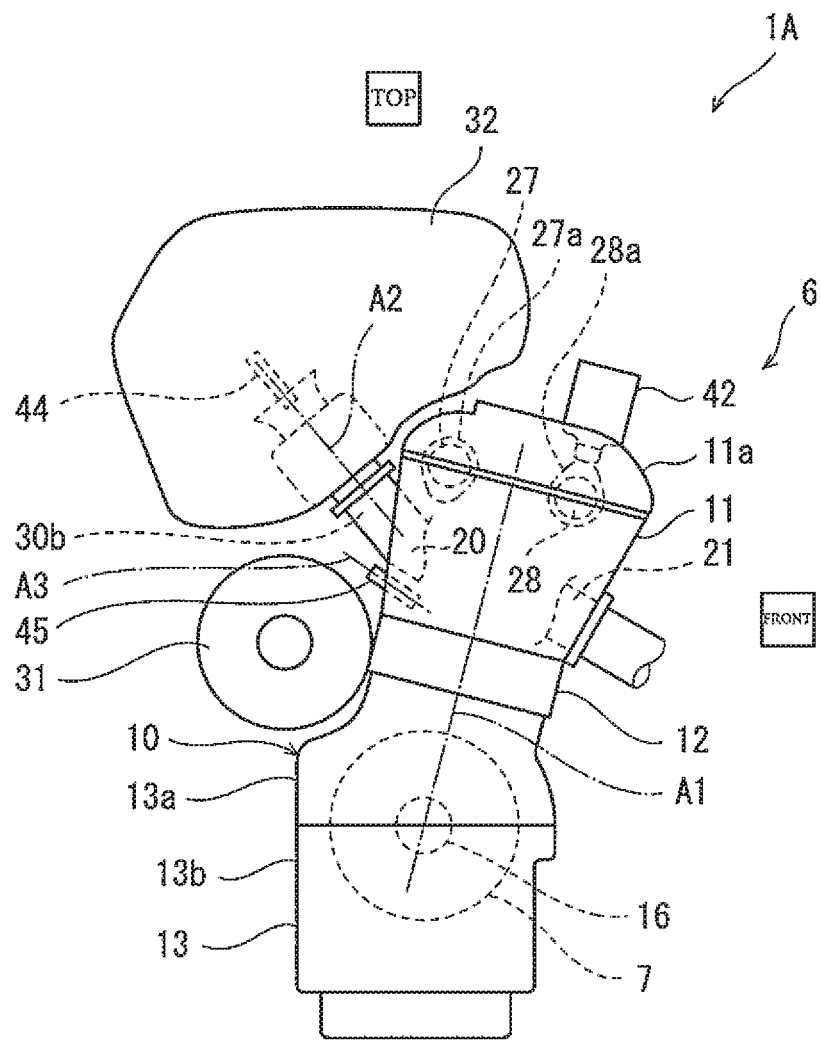
FIG. 4 is a side view of the internal combustion engine of the propulsion apparatus according to the first embodiment.

FIG. 4 is a side view of the internal combustion engine as mounted in a straddle vehicle. Herein, the upward, downward, forward, rearward, leftward, and rightward directions are defined with respect to the direction in which the driver of the straddle vehicle faces. The crank shaft 16 and the camshafts 27 and 28 are arranged to extend in the leftward/rightward direction. The engine 6 is mounted in the straddle vehicle in such a manner that the exhaust port 21 is located forward of the intake port 20. The fuel pressurizing mechanism 42 is attached to the cylinder head 11 (cylinder head cover 11a) and located at an upper front end of the engine main body 10.

The engine 6 is of the downdraft type, and the chamber outlet is located on an extension A2 of the center line of the intake port 20. This extension A2 coincides with the center line of the intake passage 30b. The components constituting the intake system extend rearward and upward from the rear surface of the cylinder head 11. The downstream fuel feeder 45 is in the form of a stepped tube, and the center line A3 and therefore the fuel injection direction of the downstream fuel feeder 45 extend approximately parallel to the center line of the intake passage 30b.

The intake chamber box 32 which is a relatively large component is disposed rearward and upward of the engine main body 10. The crank case 13 is formed of an upper case portion 13a and a lower case portion 13b divided by a cross-section along the axis about which the crank shaft 16 rotates (i.e., an extension of the journal portion 16a). The cylinder block 12 is disposed above the front of the upper case portion 13a. The supercharger 31 is disposed in a space located above the rear of the upper case portion 13a and rearward of the cylinder head 11.

In the present embodiment, the two electricity generation motors 7, which are connected to the crank shaft 16, are also housed in the crank case 13 together with the crank shaft 16. That is, the electricity generation system 2 is constructed as a unit.

Referring back to FIG. 1, electricity generated by the two electricity generation motors 7 is stored in the electricity storage device 3. The electricity generation motors 7 are, for example, three-phase induction motors. The electricity generation motors 7 are electrically connected to the electricity storage device 3 via inverter devices 8a provided in one-to-one correspondence with the motors 7. Each inverter device 8a converts alternating-current electricity generated by the corresponding electricity generation motor 7 to direct-current electricity, with which the electricity storage device 3 is charged. The electricity storage device 3 is, for example, a battery or capacitor.

The electricity storage device 3 is electrically connected to the propulsion motor 4 via an inverter device 8b. The propulsion motor 4 is, for example, a three-phase induction motor. The inverter device 8b converts direct-current electricity stored in the electricity storage device 3 to alternating-current electricity, which is delivered to the propulsion motor 4. The inverter device 8b controls the rotational speed of the output shaft of the propulsion motor 4 according to a control command sent from the controller 5.

The controller 5 controls the amount of electricity supplied to the propulsion motor 4 so as to propel the straddle vehicle according to operation of the straddle vehicle by the driver. The controller 5 is, for example, a computer, which includes a processor such as a CPU and memory devices such as a ROM and a RAM (all of the processor and memory devices are not shown). The memory devices store programs to be executed by the processor and various fixed data. The processor exchanges data with external devices. The processor receives detection signals input from different instruments and outputs control signals to different control targets. The controller 5 may execute the different processes by central control using a single computer or by decentralized control using a plurality of cooperating computers.

The controller 5 is communicably connected to a propulsion demand sensor 5a, the electricity storage device 3, the actuator 36, and the inverter device 8b. The propulsion demand sensor 5a is a sensor installed in the straddle vehicle to detect a propulsion demand made on the propulsion motor 4 according to a given operation by the driver. In an example where the straddle vehicle is a motorcycle, the propulsion demand sensor 5a corresponds to an acceleration operation sensor that detects the degree of operation of an acceleration operation member (throttle grip) operated by the driver. The propulsion demand sensor 5a sends the detected propulsion demand to the controller 5. On the basis of the propulsion demand made on the propulsion motor 4, the controller 5 controls the inverter device 8b to supply electricity meeting the propulsion demand to the propulsion motor 4 from the electricity storage device 3.

In order to supply electricity meeting the propulsion demand to the propulsion motor 4, the controller 5 appropriately controls the amount of electricity generated by the electricity generation system 2 and the amount of electricity stored in the electricity storage device 3. A signal related to the amount of electricity stored in the electricity storage device 3 is sent to the controller 5 from the electricity storage device 3.

In the present embodiment, the engine 6 is controlled by the controller 5 to keep a (constant) rotational speed within a predetermined engine rotational speed range during the period of operation of the engine 6, in particular the non-transition period excluding the start-up period and shutdown period. The predetermined engine rotational speed range (hereinafter referred to as "constant speed rotation range") is preferably set within the power band of the engine. The power band refers to a rotational speed range over which the engine can exhibit its performance most efficiently and is generally a range between the rotational speed at which the torque of the engine is maximum and the rotational speed at which the horsepower of the engine is maximum. Thus, in the non-transition period, the engine 6 is operated basically in the constant speed rotation range so as to exhibit its performance most efficiently.

The constant speed rotation range predetermined for the engine 6 in the present embodiment will be described in more detail. Since the engine 6 is a two-stroke engine, the rotational speeds at which the engine 6 operates with high efficiency are lower than the rotational speeds at which four-stroke engines operate with high efficiency (this feature will be described in detail later). If the engine 6 is operated in a high rotational speed range, mechanical loss including pumping loss and sliding friction loss will occur. Further, if the engine 6 is operated in a high rotational speed range, a large counter-electromotive force will be generated in the electricity generation motor 7. Thus, operation of the engine 6 in a rotational speed range above a rotational speed (e.g., 6500 rpm) is disadvantageous in terms of efficiency for both the engine 6 and the electricity generation motor 7. However, since in the present embodiment the supercharger 31 is rotationally driven by the crank shaft 16, operation of the engine 6 in an extremely low rotational speed range (e.g., below 2000 rpm) will cause the supercharger 31 to fail to generate sufficient torque for delivering intake air to the combustion chambers S1. In the present embodiment, therefore, the range between 2000 rpm and 6500 rpm (inclusive) is defined as the constant speed rotation range for the engine 6, and the engine 6 is operated at a constant rotational speed (e.g., 3000 rpm) within the constant speed rotation range.

In the present embodiment, the controller 5 controls the actuator 36 of the throttle device 33 based on the amount of electricity stored in the electricity storage device 3 and the propulsion demand made on the propulsion motor 4. For example, in order to prevent overcharge of the electricity storage device 3, the controller 5 may, when the amount of electricity stored in the electricity storage device 3 exceeds a predetermined level, cause the actuator 36 to act to stop the operation of the engine 6 even if the propulsion motor 4 is in operation.

During the non-transition period, the controller 5 controls the actuator 36 of the throttle device 33 basically in such a manner that the engine 6 is operated in the predetermined constant speed rotation range as described above. However, it is conceivable that the amount of electricity stored in the electricity storage device 3 becomes insufficient when the amount of electricity consumed by the propulsion motor 4 is significantly larger than the amount of electricity generated by operation of the engine 6 in the constant speed rotation range. Thus, in the exceptional case where the amount of electricity stored in the electricity storage device 3 falls below a predetermined level or the propulsion demand sent from the propulsion demand sensor 5a exceeds a predetermined level, the controller 5 may control the actuator 36 so as to increase the engine rotational speed (engine torque) in favor of the increase in electricity generation over efficiency, i.e., so as to cause the engine 6 to operate at a rotational speed above the constant speed rotation range.

During the start-up period and shutdown period, the operation taking into account the engine efficiency may not be performed. For example, in the start-up period, the engine torque may be set higher than in the non-transition period in order to allow the inertial bodies such as the piston 15 and the electricity generation motor 7 to smoothly move or rotate. In the start-up period and shutdown period, the controller 5 may, in order to prevent an abrupt change in the engine rotational speed, control the actuator 36 of the throttle device 33 so as to gradually change the throttle opening degree and gradually change the engine rotational speed over time.

(Combustion Cycle in Each Cylinder)

Figure 5:
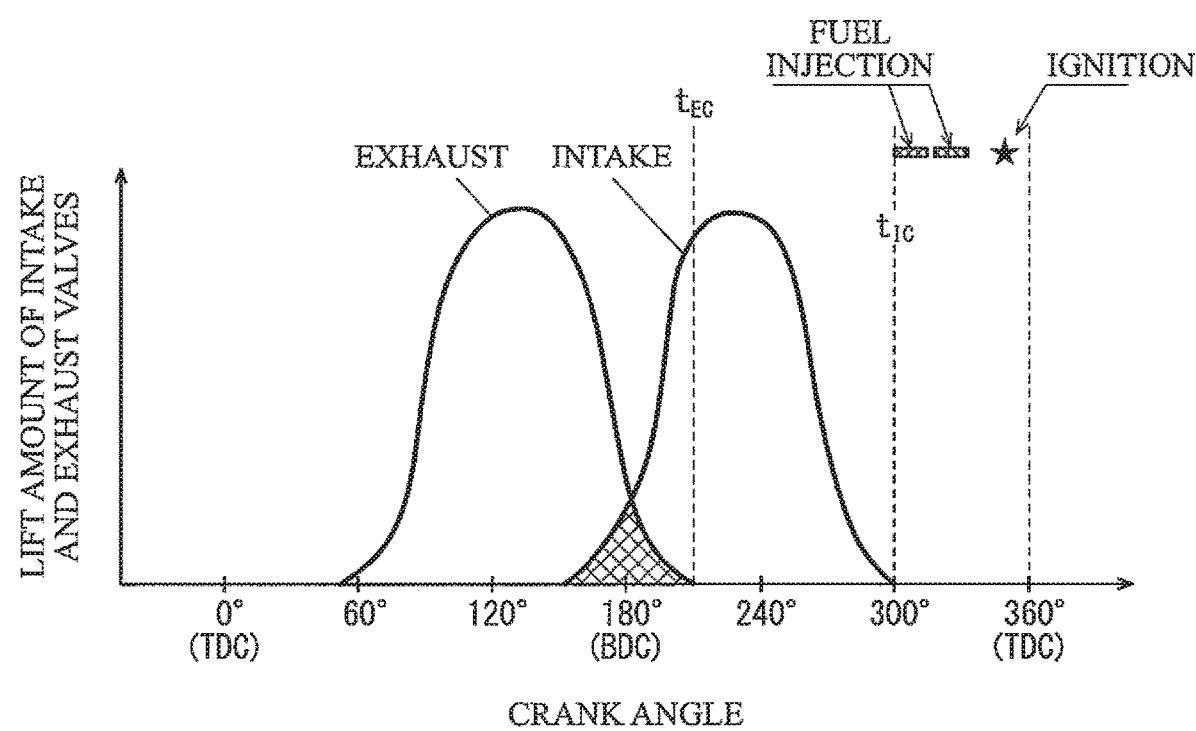
FIG. 5 is a graph showing the change in lift amount of intake and exhaust valves.

FIG. 5 is a graph showing the change in lift amount of the intake and exhaust valves for a cylinder and indicating the fuel injection timing and ignition timing for the cylinder. For convenience of illustration, the crank angle for the piston 15 positioned at the top dead center is defined as 0° or 360°, and the crank angle for the piston 15 positioned at the bottom dead center is defined as 180°. The engine 6 is a two-stroke engine, and one combustion cycle in the cylinder is completed while the piston 15 reciprocates once by starting from the top dead center and returning to the top dead center.

When the piston 15 is around the bottom dead center, the exhaust valve 23 is closed, and the intake valve 22 is opened. Thus, the intake air compressed by the supercharger 31 is supplied into the combustion chamber S1 through the intake openings 18.

While the piston 15 is moving upward after a valve closing timing $t_{IC}$ at which the intake valve 22 is closed, the downstream fuel feeder 45 injects the fuel into the combustion chamber S1, where the air-fuel mixture is produced. In the present embodiment, the downstream fuel feeder 45 injects the fuel in separate periods (e.g., two separate periods). In other words, a non-injection period in which the fuel is not directly injected occurs between the fuel injection periods. All of the fuel injection periods are set after closing of the intake valve 22. In order to reduce the amount of hazardous substances in exhaust gas which are to be treated with a three-way catalyst, the amount of the fuel injected from the downstream fuel feeder 45 may be so set that the ideal air-fuel ratio is achieved in the constant speed rotation range set for the non-transition period.

After the fuel is fed into the combustion chamber S1 by the downstream fuel feeder 45, the ignition plug 24 acts to ignite and burn the compressed air-fuel mixture in the combustion chamber S1. The ignition timing is set around the moment when the piston 15 is at the top dead center. Upon receiving energy derived from burning of the air-fuel mixture, the piston 15 moves downward and rotationally drives the crank shaft 16.

During downward movement of the piston 15, the exhaust valve 23 is opened, and the combustion gas is discharged to the exhaust port 21 and hence to the outside air through the exhaust openings 19. A valve closing timing $t_{EC}$ at which the exhaust valve 23 is closed is set after the valve opening timing of the intake valve 22. Thus, for the engine 6, a period in which both the intake valve 22 and the exhaust valve 23 are open occurs around the moment when the piston 15 is at the bottom dead center. This period is what may be called a valve overlap period, which will be referred to as "VOL period" hereinafter (see the cross-hatched region in FIG. 5). The VOL period can be set depending on the design of the profiles of the intake cam 27a and exhaust cam 28a.

In the present embodiment, the four crank pin portions 17 of the crank shaft 16 are arranged to have a phase difference of 90° or 180° from one another. Thus, the above-described combustion cycles of the four cylinders have a phase difference of 90° or 180° from one another. Specifically, the second pin portion 17b, the third pin portion 17c, and the fourth pin portion 17d are respectively disposed in such positions as to have phase differences of 180°, 90°, and 270° from the first pin portion 17a. Thus, the ignition of the air-fuel mixture takes place first in the cylinder corresponding to the first pin portion 17a, then in the cylinder corresponding to the third pin portion 17c, then in the cylinder corresponding to the second pin portion 17b, and finally in the cylinder corresponding to the fourth pin portion 17d. That is, the ignition timings in the four cylinders are shifted from one another by so arranging the four crank pin portions 17 of the crank shaft 16 that they have a phase difference of 90° or 180° from one another.

In the propulsion apparatus 1A of the present embodiment, the engine 6 is an engine in which the air-fuel mixture inside the cylinder 14 is burned once for every reciprocation of the piston 15; namely, a two-stroke engine is provided as the engine 6. With the two-stroke engine, the energy extracted per unit rotational speed (thermal energy generated by combustion and therefore mechanical energy derived from the rotational motion of the crank shaft) is higher than with a four-stroke engine in which the air-fuel mixture inside the cylinder is burned once during two reciprocations of the piston 15. Thus, the rotational speed range over which the engine 6 operates with high efficiency can be shifted to the low rotational speed side.

Figure 6:
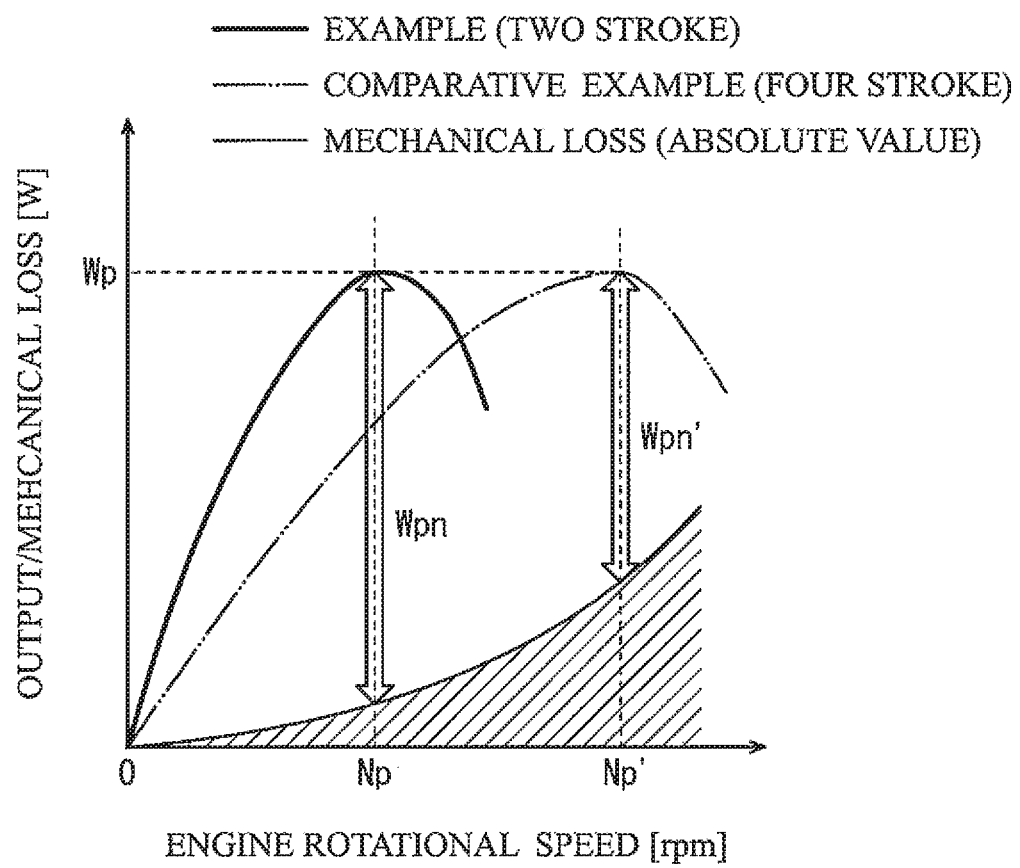
FIG. 6 is a rotational speed-output curve of the internal combustion engine of the propulsion apparatus according to the first embodiment.

This feature will now be described with reference to FIG. 6. In FIG. 6, the rotational speed-output curve of the engine 6 according to the present embodiment is indicated by a thick solid line, while the rotational speed-output curve of an engine according to a comparative example is indicated by a dashed-two dotted line. The engine according to the comparative example is a four-stroke engine and has an output peak value Wp equal to that of the engine 6 according to the present embodiment. In the present embodiment, as seen from the figure, the engine rotational speed (rotational speed Np at output peak) required to obtain the output peak value Wp equal to that in the comparative example can be reduced to approximately half of the rotational speed Np' at output peak in the comparative example. Thus, the rotational speed range over which the engine 6 operates with high efficiency can be shifted to the low rotational speed side.

FIG. 6 also shows the absolute value of mechanical loss with respect to the engine rotational speed (see the thin solid line and the cross-hatched region shown beneath the thin solid line). In reciprocating engines, mechanical loss (including pumping loss and friction loss) is approximately proportional to the square of the engine rotational speed. When the rotational speed Np' at output peak is in a high rotational speed range as in the comparative example, the mechanical loss occurring at the rotational speed Np' is large. Thus, the net output peak value Wpn' obtained when the engine rotational speed is at the rotational speed Np' is significantly smaller than the output peak value Wp. The rotational speed Np at output peak in the engine 6 according to the present embodiment is lower than the rotational speed Np' at output peak in the comparative example and, therefore, the mechanical loss occurring at the rotational speed at output peak is smaller in the engine 6 than in the engine of the comparative example. The net output peak value Wpn in the present embodiment is accordingly larger than the net output peak value in the comparative example. By thus achieving high-efficiency operation in a low rotational speed range and avoiding operation in a high rotational speed range, the mechanical loss including pumping loss and sliding friction loss can be reduced.

As for the electricity generation motor 7, reduction in counter-electromotive force can be achieved by the avoidance of operation in a high rotational speed range, and the electricity generation efficiency can be increased. That is, a low rotational speed range over which both the engine 6 and the electricity generation motor 7 efficiently operate can be employed as the constant speed rotation range for the engine 6, and the overall electricity generation efficiency of the system can be improved. For these reasons, an efficient propulsion apparatus can be provided.

In the present embodiment, since the rotational speed of the engine 6 is mainly in the constant speed rotation range during operation of the engine 6, vibration and vibration-induced noise can easily be suppressed by supporting the engine 6 and its related components in such a manner as to reduce the natural frequency in the constant speed rotation range.

In the present embodiment, the engine rotational speed is set lower than in the case of four-stroke engines. Thus, the start-up period and shutdown period can be shortened, and the total length of the transition periods can be reduced. This leads to a reduction in vibration occurring during the transition periods.

In the present embodiment, since the engine 6 can operate in a low rotational speed range, it is possible to increase the lengths of the valve opening periods of the intake valve 22 and exhaust valve 23 or decrease the reciprocation speeds of the intake valve 22 and exhaust valve 23. Increasing the lengths of the valve opening periods of the intake valve 22 and exhaust valve 23 can lead to an increase in charging efficiency and an enhancement of scavenging effect. Decreasing the reciprocation speeds of the intake valve 22 and exhaust valve 23 can lead to a reduction in damage caused to the intake valve 22 and exhaust valve 23 due to their sliding movement.

The inclusion of the supercharger 31 makes it possible to supply supercharged air into the cylinder 14 and increase the amount of air intake (compressibility), resulting in increased combustion efficiency. The provision of the VOL period enables promoting scavenging by the use of supercharged air during this period. Feeding the fuel into the cylinder 14 after closing of the exhaust valve 23 leads to prevention of discharge of unburned fuel to the outside of the cylinder 14, thus providing a reduction in the amount of unburned fuel contained in exhaust gas.

In the present embodiment, since the downstream fuel feeder 45 injects the fuel after closing of the intake valve 22, the compression ratio of the cylinder 14 can be further increased to further improve the fuel efficiency.

In the present embodiment, the input shaft of the electricity generation motor 7 is connected to the output shaft of the engine 6 so as to rotate at the same rotational speed as the output shaft of the engine 6, and the engine 6 is a two-stroke engine capable of operating at a low rotational speed and a high torque. Thus, the electricity generation efficiency can be improved without having to provide a speed-reducing mechanism between the input shaft of the electricity generation motor 7 and the output shaft of the engine 6, and the overall structure of the system can be simplified.

In the present embodiment, the input shafts of the two electricity generation motors 7 are respectively connected to both ends of the crank shaft 16 of the engine 6. The two electricity generation motors 7, together with the crank shaft 16, are housed in the crank case 13, and the electricity generation system 2 is constructed as a unit. Thus, the position of the center of gravity of the unit can be more properly adjusted than when only one electricity generation motor is provided at one end of the crank shaft 16.

Since the two electricity generation motors 7 are aligned with each other in the axial direction of the crank shaft 16, displacement of the center of gravity of the entire electricity generation system in the axial direction of the crank shaft 16 can be more easily prevented than when only one electricity generation motor is provided.

The controller 5 controls the actuator 36 of the throttle device 33 based on the amount of electricity stored in the electricity storage device 3 and the propulsion demand made on the propulsion motor 4. The torque of the engine 6 is controlled via the actuator 36 according to whether the amount of stored electricity is excessive or insufficient and whether the propulsion demand is high or low, so that the output of the engine 6 can be prevented from being excessive or insufficient.

The supercharger 31 is driven by the crank shaft 16 and is configured as a mechanical supercharger. As described above, the engine 6 according to the present embodiment is operated in a predetermined constant speed rotation range, such as a low rotational speed range between 2000 rpm and 6500 rpm, inclusive. Mechanical superchargers can easily exert their performance in a low to mid rotational speed range even when the amount of exhaust emission is small. Thus, with the use of a mechanical supercharger as the supercharger 31, the supercharger 31 can exert its performance over a large portion of the rotational speed range in which the engine 6 operates, thus ensuring high air intake efficiency and high scavenging efficiency.

In the present embodiment, a low rotational speed range below 6500 rpm is employed, and thus the excitation force generated in the engine 6 can be reduced. This makes it possible, for example, to decrease the rigidity of the bearings or the cylinders 14 in the engine 6 or reduce the need for adding any component for preventing vibration. The employment of a low rotational speed range below 6500 rpm can reduce the thermal influence on the engine 6.

Second Embodiment

Next, a propulsion apparatus 1B according to a second embodiment will be described with reference to FIGS. 7 and 8.

Figure 7:
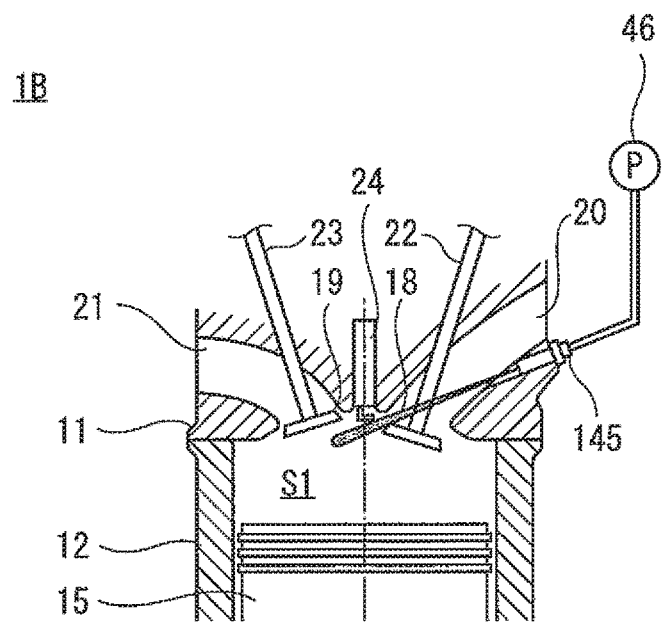
FIG. 7 is a cross-sectional view of an internal combustion engine of a propulsion apparatus according to a second embodiment.
Figure 8:
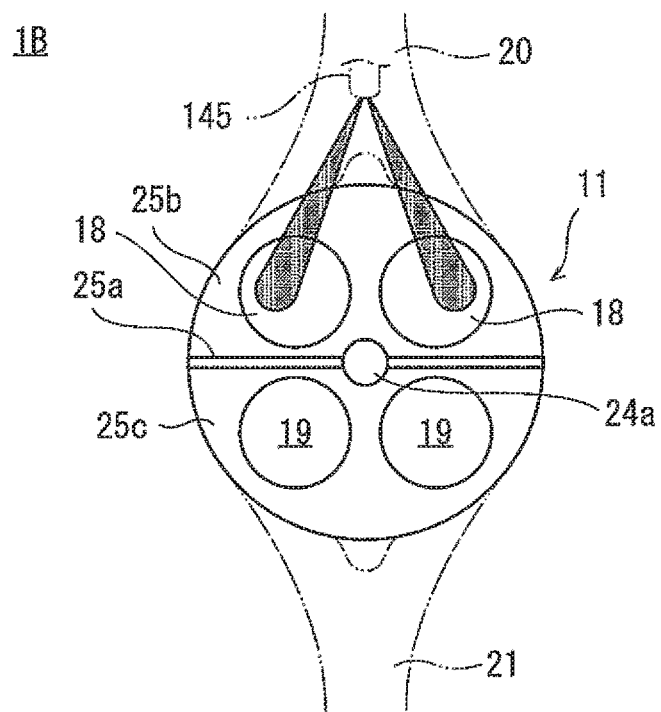
FIG. 8 shows a combustion chamber according to the second embodiment as viewed from below.

FIG. 7 is a cross-sectional view of the engine 6 of the propulsion apparatus 1B according to the present embodiment, and FIG. 8 shows the combustion chamber S1 as viewed from below. In the first embodiment, the injection opening of the downstream fuel feeder 45 opens inside the cylinder 14 to "inject the fuel into the cylinder", while in the present embodiment, as shown in FIGS. 7 and 8, an injection opening of a downward fuel feeder 145 opens inside the intake port 20.

That is, the downward fuel feeder 145 is attached to the cylinder head 11 in such a manner that the injection opening of the downward fuel feeder 145 opens inside the intake port 20. In the present embodiment, the downward fuel feeder 145 injects the fuel during the valve opening period of the intake valve 22 (see FIG. 7). After closing of the intake valve 22, the ignition plug 24 acts to ignite and burn the compressed air-fuel mixture in the combustion chamber S1. When the two intake openings 18 are provided and the intake port 20 has one inlet, the injection opening of the downward fuel feeder 145 is located closer to the inlet of the intake port 20 than to a branch point at which the intake port 20 is branched into two parts (see FIG. 8).

As shown in FIG. 7, the downward fuel feeder 145 injects the fuel in such a manner that the fuel diffuses approximately in a circular conical pattern. Hereinafter, the center line of the circular conical pattern formed by the diffusing fuel will be referred to as "the center line of injected fuel". The downward fuel feeder 145 injects the fuel in such a manner that the center line of injected fuel passes through a gap between the valve element and valve seat of the intake valve 22. Thus, the fuel injected into the intake port 20 can reach the interior of the cylinder 14. The valve opening period of the downward fuel feeder 145 is set in view of the lift amount of the intake valve 22 so as to allow the fuel to pass through the gap mentioned above. In the present embodiment, the fuel is injected after the VOL period shown in FIG. 5, in particular after closing of the exhaust valve 23 and before closing of the intake valve 22. At the valve closing timing $t_{EC}$ of the exhaust valve 23, the increasing lift amount of the intake valve 22 has reached about 90% of the maximum lift amount. Thus, when the valve opening period of the downward fuel feeder 145 is so set that the downward fuel feeder 145 starts to inject the fuel immediately after closing of the exhaust valve 23, the center line of injected fuel can easily pass through the gap mentioned above. The gap is formed in a ring shape along the entire circumference of the intake opening 18. As shown in FIG. 7, in order to allow the fuel to pass through the gap in proximity to the ignition plug 24, a hole for attachment of the downward fuel feeder 145 may be formed below the intake port 20 in the cylinder axis direction. Thus, the space for disposing the downward fuel feeder 145 which injects the fuel into the intake port 20 can be easily secured.

As shown in FIG. 8, the injection opening of the downward fuel feeder 145 is configured to inject the fuel in two directions. One of the center lines of injected fuel is directed toward one of the intake openings 18, while the other of the center lines of injected fuel is directed toward the other of the intake openings 18. Since the fuel is delivered to both of the intake openings 18, the distribution of the air-fuel mixture in the combustion chamber S1 can be uniform. Additionally, since the fuel injection takes place in a supercharged atmosphere, the fuel can be reliably prevented from flowing back from the cylinder 14. Further, soot is unlikely to adhere to the downstream fuel feeder 45.

The present embodiment can provide the same effects as the first embodiment. In the present embodiment, the fuel can be injected even at a reduced fuel pressure, and thus the fuel pressurizing mechanism 42 and the accumulator 47 may be eliminated. This allows simplification of the structure of the fuel system. The downward fuel feeder 145 does not need to have high pressure resistance, and a general-purpose injector can be used. The fuel discharged from the primary fuel pump 46 is delivered to the downward fuel feeder 145.

In the present embodiment, some time lag occurs between when a fuel injection command (valve opening command) is given to the downward fuel feeder 145 and when the fuel reaches the interior of the cylinder 14. The fuel injection command may be given early in view of this time lag. For example, the fuel injection command may be given to the downward fuel feeder 145 at a time earlier than the valve closing timing of the exhaust valve 23 by an amount corresponding to the time lag. Thus, "fuel injection after closing of the exhaust valve" encompasses the case where the exhaust valve 23 is closed before the fuel injected from the downward fuel feeder 145 reaches the cylinder 14.

The components and their arrangement shown in FIGS. 7 and 8 are only an example for the case where port injection as described above is employed, and modifications may be made as appropriate. The gap through which the fuel passes is not limited to the portion as shown in FIG. 7 which is in proximity to the ignition plug 24 in a direction orthogonal to the cylinder axis, and the fuel may pass through any portion of the gap formed in a ring shape around the intake opening 18. It is not essential to provide one downward fuel feeder 145 for each cylinder 14. For each cylinder 14, a plurality of downward fuel feeders 145 may be provided in one-to-one correspondence with the plurality of intake openings 18.

Third Embodiment

Next, a propulsion apparatus 1C according to a third embodiment will be described with reference to FIGS. 9 and 10.

Figure 9:
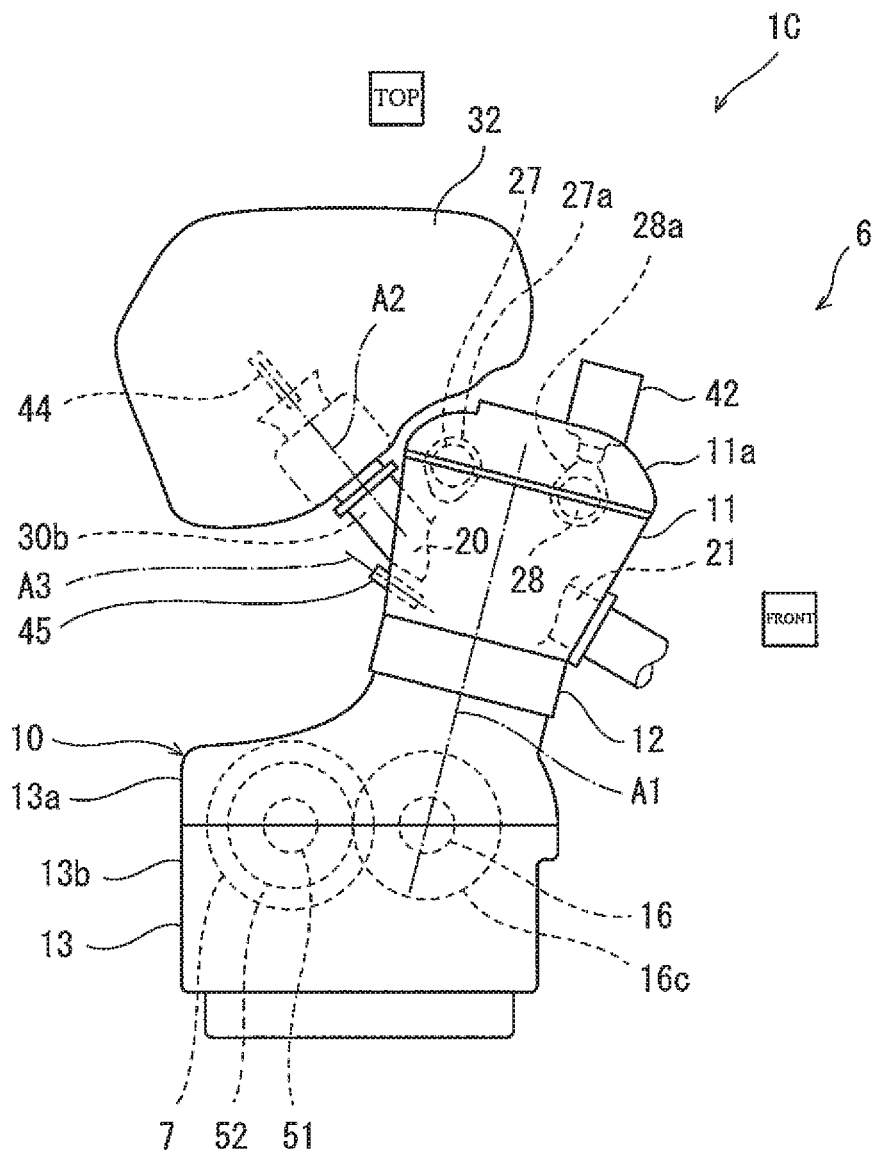
FIG. 9 is a side view of an internal combustion engine of a propulsion apparatus according to a third embodiment.

FIG. 9 is a side view of the engine 6 of the propulsion apparatus 1C. FIG. 10 is a schematic diagram of the interior of the engine 6 of the propulsion apparatus 1C. In the present embodiment, the engine 6 includes a balancer shaft 51 disposed parallel to the crank shaft 16. The input shafts of the two electricity generation motors 7 are respectively connected to both ends of the balancer shaft 51, rather than to both ends of the crank shaft 16. The present embodiment is substantially the same as the first embodiment except for the locations where the electricity generation motors 7 are mounted, and the same features will not be described again.

The balancer shaft 51 serves to suppress first-order couple vibration of the crank shaft 16. In the present embodiment, the four crank pin portions 17 of the crank shaft 16 have a phase difference of 90° or 180° from one another in order that the ignition timings in the four cylinders may be shifted from one another. This increases the occurrence of the first-order couple vibration of the crank shaft 16. Thus, in the present embodiment, the balancer shaft 51 which rotates at the same speed as the crank shaft 16 is provided to suppress the first-order couple vibration.

Figure 10:
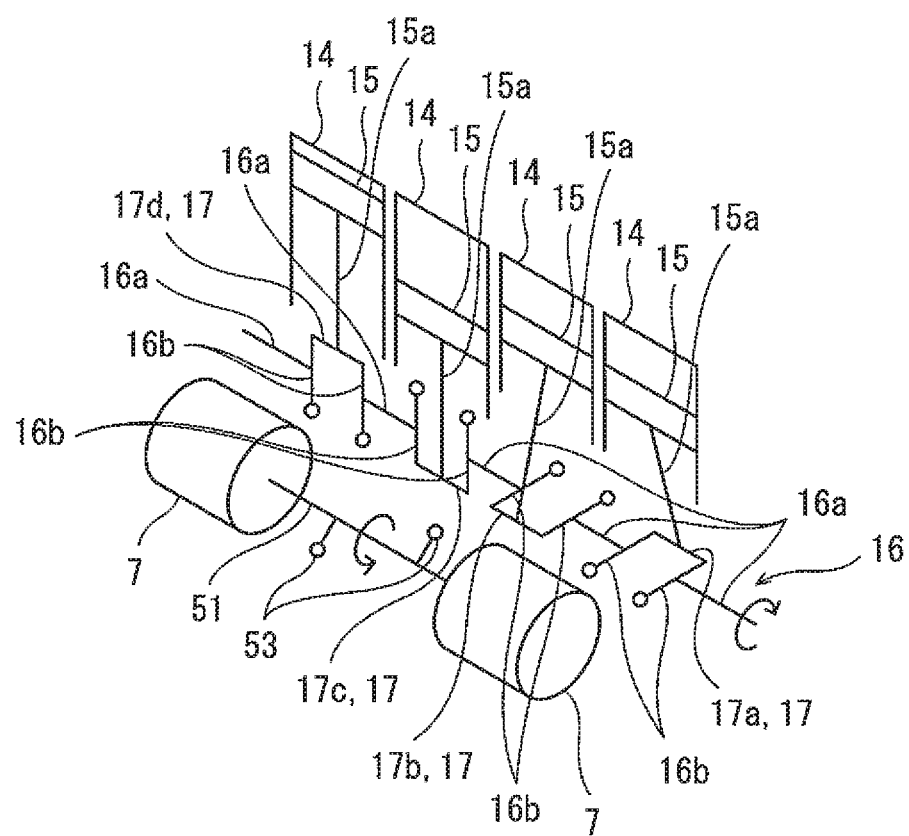
FIG. 10 is a schematic diagram of the interior of the internal combustion engine of the propulsion apparatus shown in FIG. 9.

As shown in FIG. 10, the balancer shaft 51 is provided with balancer weights 53 (not shown in FIG. 9). As shown in FIG. 9, a gear 16c is attached to the crank shaft 16, and the gear 16c rotates together with the crank shaft 16. To the balancer shaft 51 is attached a gear 52 (not shown in FIG. 10) that meshes with the gear 16c. The gear 52 of the balancer shaft 51 has the same number of teeth as the gear 16c, and the balancer shaft 51 is operable in conjunction with the crank shaft 16 coupled to the piston 15 and rotates at the same speed as the crank shaft 16.

As shown in FIG. 10, the input shafts of the electricity generation motors 7 are respectively connected to both ends of the balancer shaft 51. The balancer shaft 51 and the respective input shafts of the electricity generation motors 7 are connected, for example, via shaft couplings so as to be coaxial with one another. That is, the two electricity generation motors are aligned with each other in the axial direction of the balancer shaft 51 and hence in the axial direction of the crank shaft 16 which is parallel to the balancer shaft 51. The input shafts of the electricity generation motors 7 receive power transmitted from the crank shaft 16 via the balancer shaft 51. That is, upon rotation of the crank shaft 16 serving as the output shaft of the engine 6, the balancer shaft 51 is rotationally driven at the same rotational speed as the crank shaft 16, and consequently the input shafts of the electricity generation motors 7 which have received power transmitted from the balancer shaft 51 are rotationally driven at the same rotational speed as the crank shaft 16.

As shown in FIGS. 9 and 10, the balancer shaft 51 is disposed parallel to the crank shaft 16. The balancer shaft 51 is shorter than the crank shaft 16. In the present embodiment, the two electricity generation motors 7 overlap the crank shaft 16 when viewed in a direction orthogonal to both the crank shaft 16 and the balancer shaft 51. The balancer shaft 51 is housed in the crank case 13, together with the two electricity generation motors 7 connected to the balancer shaft 51. As shown in FIG. 9, the crank shaft 16 and the balancer shaft 51 are located in the same plane dividing the crank case 13 into the upper case portion 13a and the lower case portion 13b.

The present embodiment can provide the same effects as the first embodiment. Additionally, in the present embodiment, the flexibility in choosing the locations where the electricity generation motors 7 are mounted is higher than in the case where the electricity generation motors 7 are directly connected to the crank shaft 16. This offers increased design flexibility. For example, the electricity generation motors 7 can be located axially inward of both ends of the crank shaft 16 in the axial direction of the crank shaft 16 to prevent the electricity generation motors 7 from projecting in the axial direction of the crank shaft 16 and prevent an increase in the overall axial dimension of the electricity generation system constructed as a unit. This allows compact construction of the system as a whole.

In the present embodiment, the balancer shaft 51 is shorter than the crank shaft 16, and the electricity generation motors 7 are connected to the ends of the balancer shaft 51. This enables effective use of spaces located on the balancer shaft 51-side with respect to the crank shaft 16 and lying in the axial direction of the balancer shaft 51.

Other Embodiments

Although some embodiments have been described above, a feature may be modified, added, or eliminated without departing from the scope of the present invention.

For example, the features described above in the first to third embodiments can be combined as appropriate.

In the above embodiments, the fuel for the engine 6 is gasoline. However, the fuel for the engine 6 is not limited to gasoline and may be, for example, light oil, natural gas, or hydrogen. It is preferable for the fuel for the engine 6 to be fuel such as gasoline which can be injected in the form of liquid from the downstream fuel feeder 45 or 145 and subsequently burned in the form of gas in the cylinder. When the fuel evaporates in the cylinder, heat can be removed from the interior of the cylinder by the action of heat of evaporation. The heat removal can result in increased compressibility and hence further improved combustion efficiency.

The construction of the engine included in the electricity generation system of the present invention is not limited to those described in the above embodiments. For example, an existing engine including intake and exhaust valves may be used. For example, the numbers of intake and exhaust ports are not limited to those described in the above embodiments. For example, the throttle device 33 does not need to be an electronically controlled device, and the throttle valve 34 does not need to be provided for each cylinder. In order to achieve weight reduction, one throttle valve 34 may be provided for a plurality of cylinders. The engine 6 does not need to be driven with high responsiveness since the purpose of driving of the engine 6 is to electrically charge the electricity storage device 3. Thus, a throttle valve of the governor type whose throttle amount is adjusted according to the engine rotational speed may be used.

Although the engine 6 described in the above embodiments is of the downdraft type, the engine 6 may be of the horizontal draft type. The orientation of the engine 6 is not limited to that described in the above embodiments. For example, the crank shaft 16 and the camshafts 27 and 28 may extend in the forward/rearward direction or upward/downward direction with respect to the direction in which the driver of the vehicle faces although in the above embodiments the crank shaft 16 and the camshafts 27 and 28 extend in the leftward/rightward direction with respect to the direction in which the driver of the vehicle faces. Further, the cylinder block 12 may be disposed below the crank case 13 with respect to the direction in which the driver of the vehicle faces although in the above embodiments the cylinder block 12 is disposed above the crank case 13 with respect to the direction in which the driver of the vehicle faces.

In the above embodiments, the exhaust camshaft 28 is provided with the pressurization cam 42a in addition to the exhaust cam 28a. However, the pressurization cam 42a may be provided in a shaft other than the exhaust camshaft 28 and operable in conjunction with the exhaust camshaft 28. The pressurization cam 42a does not need to rotate at the same speed as the exhaust cam 28a, and may have a plurality of cam noses.

The exhaust cam 28a may be configured to perform the function of the pressurization cam 42a to actuate the plunger of the fuel pressurizing mechanism 42. That is, the plunger of the fuel pressurizing mechanism 42 may be brought into contact with the exhaust cam 28a. In this case, the exhaust camshaft 28 does not need to be provided with the pressurization cam 42a in addition to the exhaust cam 28a.

In the above embodiments, a turbocharger driven by means of exhaust gas of the engine 6 may be employed as the supercharger 31 instead of the mechanical supercharger. A supercharger driven by means of an electric motor rather than by means of the engine 6 may also be employed.

In the above embodiments, a rotational speed range over which both the engine 6 and the electricity generation motor 7 efficiently operate (the rotational speed range between 2000 rpm and 6500 rpm, inclusive, in the above examples) is set as the constant speed rotation range for the engine 6. If the rotational speed range over which the engine 6 efficiently operates and the rotational speed range over which the electricity generation motor 7 efficiently operates are different, a speed changer may be provided between the engine 6 and the electricity generation motor 7 to perform conversion between a rotational speed at which the engine 6 efficiently operates and a rotational speed at which the electricity generation motor 7 efficiently operates. For example, when the rotational speed at which the electricity generation motor 7 operates with high efficiency is lower than the rotational speed at which the engine 6 operates with high efficiency, a speed reducer may be provided between the engine 6 and the electricity generation motor 7. When the rotational speed at which the electricity generation motor 7 operates with high efficiency is higher than the rotational speed at which the engine 6 operates with high efficiency, a speed increaser may be provided between the engine 6 and the electricity generation motor 7.

In the above embodiments, both the intake opening 18 and the exhaust opening 19 are formed such that in the cylinder axis direction, the openings are opposite from the crank shaft 16 when viewed from the piston 15 positioned at the top dead center. However, the present invention is not limited to this arrangement. For example, the intake opening 18 may be provided below the top dead center of the cylinder 14 in the cylinder axis direction. Specifically, the intake opening 18 may be provided in the cylinder block 12 to open to a space lying between the piston top dead center and bottom dead center in the cylinder 14. In this case, the intake opening 18 is opened and closed by the piston 15 reciprocating in the cylinder 14 rather than by the intake valve 22. That is, the piston 15 performs the function of the intake valve to open and close the intake opening 18. In this case, the lift amount of the intake valve 22 shown in FIG. 5 may be replaced with the opening degree of the intake opening 18 which varies according to the position of the piston 15.

In the third embodiment, the propulsion apparatus 1C including the balancer shaft 51 as a component for suppressing the first-order couple vibration of the crank shaft 16 has been described. However, the propulsion apparatus of the present invention does not need to include a balancer shaft. For example, the propulsion apparatus may be configured so that the crank shaft 16 is likely to undergo first-order couple vibration. For example, the four crank pin portions 17 of the crank shaft 16 may be arranged so that the second pin portion 17b, the third pin portion 17c, and the fourth pin portion 17d respectively have phase differences of 180°, 180°, and 0° from the first pin portion 17a. With this configuration, the ignition timings in the adjacent cylinders respectively corresponding to the second pin portion 17b and third pin portion 17c coincide with each other. Thus, the rigidity of the crank shaft 16 may be increased so that the crank shaft 16 can withstand a stress caused by simultaneous explosion in these cylinders.

In the first and second embodiments, the input shaft of the electricity generation motor 7 receives power transmitted directly from the crank shaft 16, while in the third embodiment, the input shaft of the electricity generation motor 7 receives power transmitted from the crank shaft 16 via the balancer shaft 51. However, the present invention is not limited to these configurations. The input shaft of the electricity generation motor 7 may receive power transmitted via a member other than the balancer shaft 51 and operable in conjunction with the crank shaft 16. For example, in the third embodiment, a shaft member operable in conjunction with the input shaft of the electricity generation motor 7 may be used instead of the balancer shaft 51, and a gear meshing with the gear 16c of the crank shaft 16 may be provided in the shaft member so that power is transmitted to the electricity generation motor 7 from the crank shaft 16 via the shaft member.

In the above embodiments, the constant speed rotation range of the engine 6 is set between 2000 rpm and 6500 rpm, inclusive. However, the present invention is not limited to this constant speed rotation range. An extremely low rotational speed range can be included in the "constant speed rotation range", for example, by using an electrically driven turbocharger as the supercharger 31 or 131 instead of the supercharger rotationally driven by the crank shaft 16 of the engine 6.

The input shaft of the electricity generation motor 7 does not need to rotate at the same speed as the output shaft of the engine 6. For example, a speed-reducing mechanism may be provided between the output shaft of the engine 6 and the input shaft of the electricity generation motor 7 to drive the input shaft of the electricity generation motor 7 at a rotational speed lower than the rotational speed of the output shaft of the engine 6.

In the above embodiments, the electricity generation system 2 includes two electricity generation motors 7. However, the number of electricity generation motors included in the electricity generation system of the present invention is not limited to two, and the electricity generation system may include one electricity generation motor or three or more electricity generation motors. For example, when the electricity generation system includes one electricity generation motor 7, the electricity generation motor may be provided at one end of the crank shaft 16 or balancer shaft 51. When a plurality of electricity generation motors 7 are provided, the electricity generation motors 7 do not need to be aligned with one another in the axial direction of the crank shaft 16. In the above embodiments, the electricity generation system 2 includes one propulsion motor 4. However, the electricity generation system of the present invention may include a plurality of propulsion motors 4. The downstream fuel feeders 45 and 145 do not need to be injectors and may be devices of another type. The upstream fuel feeder 44 may be eliminated. The elimination of the upstream fuel feeder 44 can reduce the occurrence of a phenomenon called "blow-by".

The two electricity generation motors 7 do not need to be housed in the crank case 13. For example, end portions of the crank shaft 16 may project out of the crank chamber S2, and the electricity generation motors 7 may be provided on the projecting portions of the crank shaft 16. In this case, the electricity generation motors 7 may be enclosed by a cover mounted to the side wall of the crank case 13.

The controller 5 controls the actuator 36 of the throttle device 33 based on the amount of electricity stored in the electricity storage device 3 and the propulsion demand made on the propulsion motor 4. The present invention is not limited to such control. For example, the controller 5 may control the actuator 36 based on one of the amount of electricity stored in the electricity storage device and the propulsion demand made on the propulsion motor.

The controller 5 may stop the operation of the engine 6 while allowing propulsion by the propulsion motor 4 (i.e., electricity consumption by the propulsion motor 4) to continue upon satisfaction of a demand from the driver or operator or a predetermined condition (such as when the amount of electricity stored in the electricity storage device 3 exceeds a predetermined level). When propulsion is performed in an indoor place which is greatly affected by exhaust gas or in a place where noise reduction is desired, it is desirable that the period of operation of the engine 6 be as short as possible. In such places, the propulsion apparatus in which operation of the propulsion motor 4 and operation of the engine 6 for electricity generation are separately controlled is particularly useful.

In the above embodiments, examples have been described in which the propulsion apparatus is installed in a straddle vehicle. The propulsion apparatus is not limited to installation in straddle vehicles and is suitable also for use in machines for which the demand for weight reduction or vibration reduction is relatively high. The propulsion apparatus of the present invention is also applicable, for example, as a propulsion apparatus for traveling bodies that travel on land other than straddle vehicles. For example, the propulsion apparatus of the present invention may be installed in a vehicle in which occupants sit side-by-side (e.g., a four-wheeled automobile). The propulsion apparatus of the present invention is not necessarily installed in a traveling body that travels on land and may be installed, for example, in a flying body that flies in the air. For example, the propulsion apparatus of the present invention may be installed in a multiplane, unmanned flying machine such as so-called "drone". The propulsion apparatus of the present invention is applicable as a propulsion apparatus for traveling or flying bodies other than manned vehicles. That is, the propulsion apparatus of the present invention may be installed in an unmanned vehicle.

The feature that the engine 6 can be operated in a low rotational speed range makes it possible, for example, to reduce the rigidity of the bearing components and fuel system components, thus achieving a reduction in overall weight of the propulsion apparatus. Therefore, the propulsion apparatus of the present invention is suitable for use in leisure vehicles such as straddle vehicles which need to have acceleration performance and in flying bodies which are easily affected by their own weight. Alternatively, the propulsion apparatus of the present invention may be used, for example, in a series-hybrid vehicle. The rotational speed of the drive wheel can be adjusted by the propulsion motor, and this eliminates the need for a speed-changing mechanism for adapting the rotational speed of the engine to travel of the vehicle.

The electricity generation system of the present invention is not necessarily used in a propulsion apparatus and may be used as an electricity generation system for supplying electricity to machines other than movable machines.

The configuration described in the third embodiment, in which the input shaft of the electricity generation motor 7 is connected to the balancer shaft 51, is effective for an electricity generation system incorporating a four-stroke engine.

Specifically, an electricity generation system according to an embodiment other than the above embodiments includes an internal combustion engine and an electricity generation motor that generates electricity upon an input shaft thereof being rotated by the internal combustion engine, wherein the internal combustion engine includes a piston reciprocable in a cylinder, a crank shaft coupled to the piston, and a balancer shaft operable in conjunction with the crank shaft to rotate at the same speed as the crank shaft and suppress first-order couple vibration of the crank shaft, wherein the input shaft of the electricity generation motor is connected to the balancer shaft so as to rotate at the same speed as the balancer shaft, and wherein the electricity generation motor generates electricity upon the input shaft being rotated together with the balancer shaft as a result of rotation of the crank shaft. With this configuration, the spaces lying in the axial direction of the balancer shaft can be effectively used, and the system can be compactly constructed as a whole.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. An electricity generation system comprising:
   an internal combustion engine operated in a predetermined rotational speed range; and at least one electricity generation motor that generates electricity upon an input shaft thereof being rotated by the internal combustion engine, wherein the internal combustion engine comprises:
- an ignition plug;
- a piston reciprocable in a cylinder;
- a crank shaft coupled to the piston;
- a valve actuating mechanism that operates in conjunction with the crank shaft and actuates an intake valve to open and close an intake opening and an exhaust valve to open and close an exhaust opening;
- a supercharger that compresses intake air to be delivered into the cylinder; and
- a fuel feeder that feeds fuel, wherein the internal combustion engine is a two-stroke engine in which an air-fuel mixture is burned once every time the piston reciprocates once by starting from a top dead center and returning to the top dead center, wherein while the piston reciprocates once by starting from the top dead center and returning to the top dead center, the valve actuating mechanism actuates the intake valve and the exhaust valve in such a manner as to provide a valve overlap period in which both the exhaust valve and the intake valve are open, the fuel feeder feeds the fuel into the cylinder after the valve overlap period and a closing of the exhaust valve, and after the closing of the exhaust valve and a closing of the intake valve, the ignition plug is controlled to ignite the air-fuel mixture inside the cylinder is burned during a period in which both the exhaust valve and the intake valve are closed.

2. The electricity generation system according to claim 1, wherein the intake opening and the exhaust opening are formed such that in an axial direction of the cylinder, the intake opening and the exhaust opening are opposite from the crank shaft when viewed from the piston positioned at the top dead center.

3. The electricity generation system according to claim 1, wherein the fuel feeder is a direct-injection injector that injects the fuel into the cylinder after the closing of the intake valve.

4. The electricity generation system according to claim 1, wherein the input shaft of the electricity generation motor is connected to an output shaft of the internal combustion engine so as to rotate at the same speed as the output shaft of the internal combustion engine.

5. The electricity generation system according to claim 1, wherein the at least one electricity generation motor comprises a plurality of electricity generation motors.

6. The electricity generation system according to claim 5, wherein the electricity generation motors are aligned with each other in an axial direction of the crank shaft.

7. The electricity generation system according to claim 1, wherein the internal combustion engine comprises a balancer shaft operable in conjunction with the crank shaft to rotate at the same speed as the crank shaft and suppress first-order couple vibration of the crank shaft, and
wherein the input shaft of the electricity generation motor receives power transmitted from the crank shaft via the balancer shaft.

8. A propulsion apparatus comprising:
the electricity generation system according to claim 1;
an electricity storage device that stores electricity generated by the electricity generation system; and
a propulsion motor that functions as a propulsion drive source by receiving electricity supplied from the electricity storage device.

9. The propulsion apparatus according to claim 8, wherein the internal combustion engine further comprises a throttle valve that adjusts an amount of intake air to be delivered into the cylinder and an actuator that actuates the throttle valve, and
wherein the propulsion apparatus further comprises a controller that controls the actuator based on at least one of an amount of electricity stored in the electricity storage device and a propulsion demand made on the propulsion motor.

10. The propulsion apparatus according to claim 8, installed in a traveling body that travels on land or a flying body that flies in air.

11. The electricity generation system according to claim 6, wherein the electricity generation motors overlap each other when viewed in the axial direction of the crank shaft.

12. The electricity generation system according to claim 6,
wherein the electricity generation motors include at least one pair of electricity generation motors arranged symmetrically with respect to a plane orthogonal to the crank shaft to prevent displacement of the center of gravity of the entire electricity generation system in the axial direction of the crank shaft.

13. The electricity generation system according to claim 6, wherein the electricity generation motors are disposed at both ends of a shaft other than the crank shaft.

14. The electricity generation system according to claim 13, wherein the shaft other than the crank shaft is disposed parallel to the crank shaft.

15. The electricity generation system according to claim 7,
wherein the internal combustion engine is a straight-four engine including four cylinders,
wherein the crank shaft includes four crank pin portions respectively associated with the four cylinders, and
wherein the crank shaft is a crossplane crank shaft in which the four crank pin portions have a phase difference of 90° or 180° from one another.

16. The propulsion apparatus according to claim 8, installed in a flying body that flies in air.

17. The electricity generation system according to claim 12, wherein the at least one pair of electricity generation motors includes a plurality of pairs of electricity generation motors, each pair of electricity generation motors being arranged symmetrically with respect to the plane.

18. The electricity generation system according to claim 1,
wherein the valve overlap period starts upon an opening of the intake valve before the piston reaches a bottom dead center and ends upon the closing of the exhaust valve after the piston reaches the bottom dead center, and
wherein the fuel feeder starts to feed the fuel into the cylinder once the exhaust valve is closed.

19. The electricity generation system according to claim 1, wherein
the intake opening and the exhaust opening open to a ceiling surface of a combustion chamber, and
the ceiling surface includes a wall portion located between the intake opening and the exhaust opening and projecting away from the intake opening toward the piston.

20. A flying body that flies in air, comprising an electricity generation system,
   wherein the electricity generation system comprises: an internal combustion engine operated in a predetermined rotational speed range; and at least one electricity generation motor that generates electricity upon an input shaft thereof being rotated by the internal combustion engine,
   wherein the internal combustion engine comprises:
      an ignition plug;
      a piston reciprocable in a cylinder;
      a valve actuating mechanism that actuates an intake valve to open and close an intake opening and that actuates an exhaust valve to open and close an exhaust opening;
      a supercharger that compresses intake air to be delivered into the cylinder;
      a fuel feeder that feeds fuel;
      a crank shaft coupled to the piston; and
      a balancer shaft operable in conjunction with the crank shaft to rotate at the same speed as the crank shaft and suppress first-order couple vibration of the crank shaft,
   wherein the internal combustion engine is a two-stroke engine in which an air-fuel mixture is burned once every time the piston reciprocates once by starting from a top dead center and returning to the top dead center,
      the valve actuating mechanism actuates the intake valve and the exhaust valve in such a manner as to provide a valve overlap period in which both the exhaust valve and the intake valve are open,
      the fuel feeder feeds the fuel into the cylinder after the valve overlap period and a closing of the exhaust valve, and
      after the closing of the exhaust valve and a closing of the intake valve, the ignition plug is controlled to ignite the air-fuel mixture inside the cylinder during a period in which both the exhaust valve and the intake valve are closed, and
   wherein the input shaft of the electricity generation motor receives power transmitted from the crank shaft via the balancer shaft.

* * * * *

UNITED STATES PATENT AND TRADEMARK OFFICE
CERTIFICATE OF CORRECTION

| | |
|---|---|
| PATENT NO. | : 11,358,461 B2 |
| APPLICATION NO. | : 16/548244 |
| DATED | : June 14, 2022 |
| INVENTOR(S) | : Yoshimoto Matsuda |

It is certified that error appears in the above-identified patent and that said Letters Patent is hereby corrected as shown below:

In the Claims

Column 23, Line 31, delete "is burned"

Signed and Sealed this
Thirtieth Day of August, 2022

Katherine Kelly Vidal
*Director of the United States Patent and Trademark Office*